Sept. 1, 1970 K. FRIEDRICH ET AL 3,526,775

CONTACTLESS TOUCH SWITCH RESPONSIVE TO INTERRUPTIONS OF INDIRECT LIGHT

Filed Dec. 10, 1968 3 Sheets-Sheet 1

INVENTORS
KURT FRIEDRICH
GEORG STRAIMER

BY Menotti J. Lombardi

ATTORNEY

INVENTORS
KURT FRIEDRICH
GEORG STRAIMER

BY [signature]

ATTORNEY

INVENTORS
KURT FRIEDRICH
GEORG STRAIMER

BY Menotti J. Lombardi
ATTORNEY 3,526,775

CONTACTLESS TOUCH SWITCH RESPONSIVE TO INTERRUPTIONS OF INDIRECT LIGHT

Kurt Friedrich, Neckarhausen, and Georg Straimer, Bad Godesberg, Germany, assignors to International Standard Electric Corporation, New York, N.Y., a corporation of Delaware Filed Dec. 10, 1968, Ser. No. 782,656
Int. Cl. G06m 7/00; H01j 39/12
U.S. Cl. 250—221 15 Claims

ABSTRACT OF THE DISCLOSURE

A contactless switch actuated by interrupting radiation from a light source impinging on a photosensitive cell by a portion of the hand. The source and cell are arranged in the chamber of a housing such that only indirect unguided radiation from the source reaches the cell in the uninterrupted mode. The chamber is provided with an opening for inserting part of the hand to interrupt the radiation reaching the cell. This opening may be covered by an elastic depressible diaphragm or a button constructed of resilient material, which excludes ambient light and foreign particles from the chamber. In the depressed mode, the diaphragm or button provides a shield which prevents virtually all radiation from reaching the cell.

This invention relates to a contactless touch switch, wherein an electric pulse is produced when a ray of light impinging on a photosensitive cell is interrupted.

In modern apparatus techniques there is the tendency to reduce the extent to which mechanical functional groups are used to a minimum by the extensive use of electronics, in order to substantially eliminate the need for servicing and to reduce the weight of the apparatus and lessen the noise it produces.

This trend has already led to proposals to design manual control elements, such as switches, press-button keys and/or complete banks or keys, on a mechanical basis but in the form of contactless touch switches or keys.

The constructions of this kind hitherto revealed operate on a capacity basis, as disclosed by the subject matter of the German patent specification No. 1,010,139 for example, in which a gas-filled cold cathode tube is used and whose ignition voltage is only reached when an earth connection to an auxiliary electrode is established by body contact achieved by touching a key button.

Touch switches based on this principle still call for a relatively large amount of circuit components. In addition, such switches are so bulky that it is not possible, for example, to form multiple key banks with the spacing normally employed in typewriter keyboards. Moreover, the overall height of such switches is too great for their use not to involve difficulties in many cases.

It is thus an object of the invention to provide a form of contactless touch switch which avoids the aforementioned disadvantages.

Based on the well-known principle of the light barrier, in which a pulse is produced when a beam of light impinging on a photoelectric cell is interrupted, the touch switch of the invention is characterized in that the beam of light passes through a trough which is constructed in such a manner that the beam of light is interrupted when the hand or part thereof is inserted into said trough.

The invention is described below with reference to embodiments illustrated in the accompanying drawings.

Figure 1:
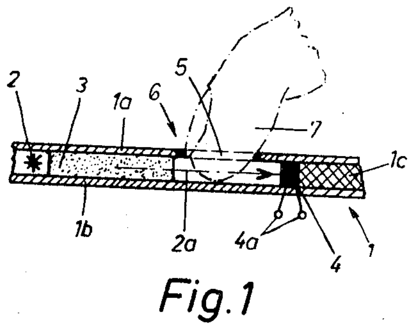
Fig. 1 PRIOR ART
FIG. 1 is a diagrammatic representation of a touch switch in cross-section.
Figure 9:
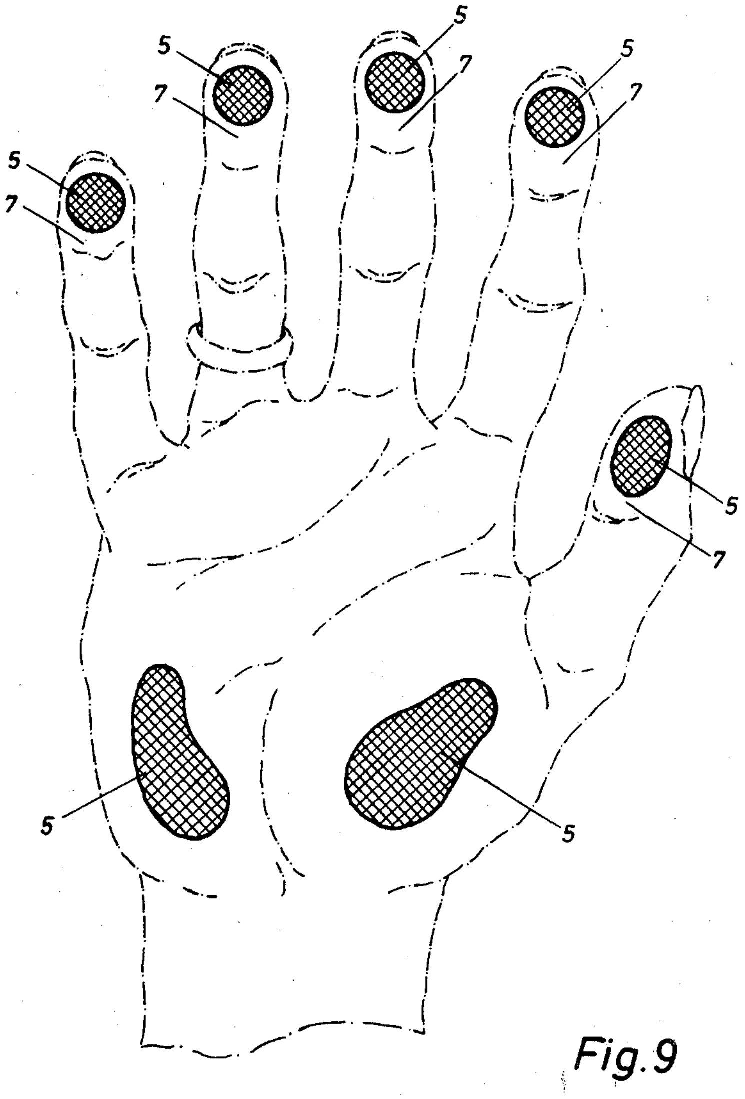
FIG. 9 is a diagrammatic representation of the underside of the cover panel of a keyboard adapted for use by a single hand.

FIG. 1 discloses the basic principle of the touch switch of the invention. The body 1 of the touch switch comprises a cover panel 1*a* and a base-plate 1*b* held in spaced relationship by an intermediate layer 1*c*. According to the cross-sectional view the intermediate layer 1*c* is provided with a recess in which there is provided a light source 2 on one side and a photosensitive cell 4, hereinafter referred to as a photoelectric cell, on the other side. The space between the two is filled with a light-conducting material 3, such as a fibre optical system, except for a small minimum area in front of the photoelectric cell 4, as shown. Thus there is a free space in front of the cell 4, and the part of the cover panel 1*a* directly above said free space is provided with a recess 5 which forms, with the cavity below it, a trough 6. The size of the trough 6 can be variable, as shown in FIG. 9, and is determined by the part of the hand to be used for actuating the touch switch.

The mode of operation is as follows. In the non-actuated state of the touch switch a beam of light 2*a* originating from the light source 2 and concentrated to a certain degree by the light-conducting material 3 impinges on the photoelectric cell 4. The potential occurring across its terminals 4*a* is regarded as the quiescent state by an evaluating electronic system (not shown) connected in series to the said terminals. Actuation of the touch switch is achieved simply by inserting a finger 7 or other part of the hand into the trough 6 in the manner shown so as to interrupt the beam of light 2*a*. The resulting cessation of the excitement of the cell 4 causes the potential at the terminals 4*a* to become zero or substantially zero, which is recognized as indicative of actuation of the touch switch by the series-connected evaluating electronic system.

Figure 2:
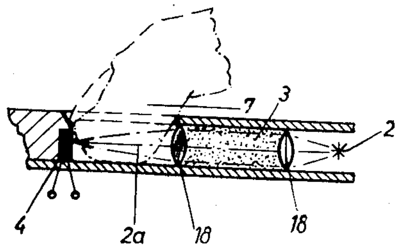
Fig. 2 PRIOR ART
FIG. 2 is a cross-section of a modification of FIG. 1 having a higher light efficiency.

FIG. 2 shows a similar arrangement. To achieve a higher luminous efficiency two concentrating lenses 18 are provided, one on each side of the light conducting material. The light radiated from the light source 2 is concentrated to a parallel beam by the first lens 18 and this beam of light is focused on to the cell 4 by the lens 18 on the other side of the light-conducting material. The light concentration thus achieved in this case makes it possible to use a light source of lower output then that required for the embodiment of FIG. 1.

Figure 3:
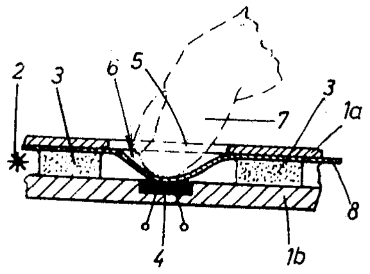
FIG. 3 is a diagrammatic cross-section of one form of the touch switch of the invention, in which the trough is covered by an elastic diaphragm.

In the embodiment illustrated in FIG. 3 the photoelectric cell 4 is disposed in the base-plate 1*b* directly beneath the recess 5 of the trough 6. In order to prevent dirtying of and/or damage to the sensitive photoelectric cell 6 there is located an elastic diaphragm 8 between the cover panel 1*a* and the light-conducting material 3, which in this case bounds the trough cavity from at least two sides.

Under normal conditions the light radiated from one or more light sources 2 and transmitted through the light-conducting material 3 impinges as diffused light on the photoelectric cell 4 to excite the same. When a finger 7 is inserted into the trough 6 the highly resilient diaphragm 8 is pressed downwardly and finally covers the photosensitive area of the photoelectric cell 4 to such an extent that actuation of the switch is clearly effected.

Figure 4:
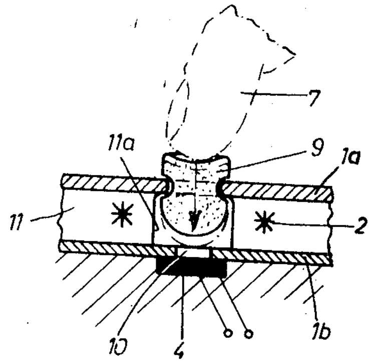
FIG. 4 shows a possible modification of the embodiment illustrated in FIG. 3.

FIG. 4 shows a modification of FIG. 3 in which the diaphragm 8 stretched across the trough 6 is replaced by a soft and resilient key member 9 which fills out part of the trough cavity when not actuated. Slight pressure applied to the member 9 for example by a finger 7 causes the aperture 10 in the base-plate **1*b* to be covered by the member 9 with the result that the light previously allowed to pass through the aperture 10 on to the photoelectric cell 4 thereunder from the light sources 2** is cut off.

In this embodiment also it is not necessary for the diagrammatically illustrated light sources 2 to be in the direct proximity of the photoelectric cell 4. Instead, light is supplied from outside light sources 2, according to the present embodiment, as shown in FIG. 5 with reference to a multiple keyboard, from which the cover panel **1*a*** has been removed for the sake of clarity.

Figure 6:
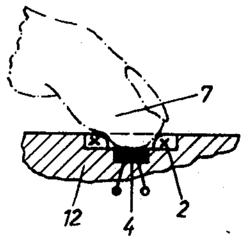
FIG. 6 is a diagrammatic cross-section of a further embodiment of the touch switch of the invention, being characterized by its small dimensions.

The embodiment shown in FIG. 6 represents a particularly flat form. In this case use is made of a substantially annular light source 2 which is either a radiator comprising self-radiating or radiation excitable material in the manner of fluorescent tubes or is an annular lamp. The light source 2 is mounted in a supporting plate 12 and directly beneath it there is concentrically disposed the photoelectric cell 4, which is excited, in the non-actuated state, of the touch switch, by the light diffusely radiated from the light source 2. The inside diameter of the annular light source 2 must be sufficiently large for the trough resulting from the aforementioned arrangement to be just large enough to allow the photoelectric cell 4 to be covered by the finger-tip when a finger is inserted in the manner shown, so as to interrupt excitation of the cell for the period of actuation.

Figure 5:
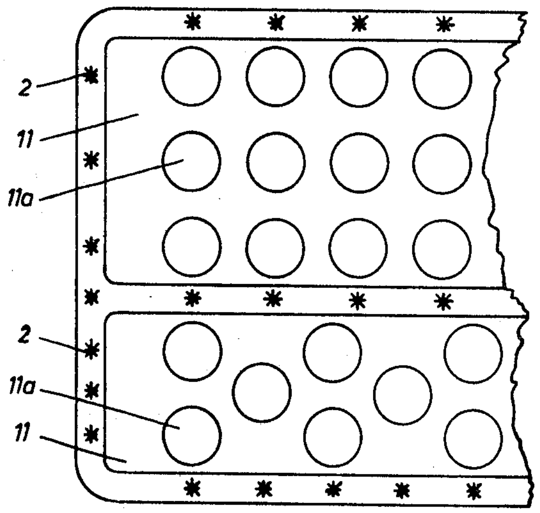
FIG. 5 represents a possible keyboard arrangement omitting the cover plate, using the touch switch illustrated in FIG. 3 or FIG. 4.
Figure 7:
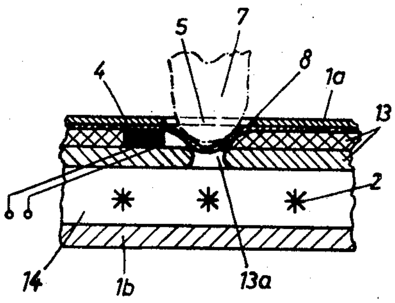
FIG. 7 is a diagrammatic cross-section of another embodiment of the touch switch of the invention, in which the light is supplied from below.

FIG. 7 illustrates an embodiment suitable for multiple keyboards of the type shown in FIG. 5. In this arrangement the light sources 2 are disposed in a chamber 14 bounded by the base-plate **1*b* and intermediate layers 13 and radiate diffuse light rays through recesses 13*a* on to the photoelectric cells 4 mounted in the intermediate layers 13 close to the recesses 13*a*. The recesses 13*a* are directly underneath the recesses 5 in the cover panel 1*a* and are funnel-shaped making them suitable as troughs for the present purpose. Since, in this case, the photoelectric cells 4 must be of relatively high sensitivity, a diaphragm 8 is disposed between the cover panel 1*a* and the top intermediate layer 13, which diaphragm is of the same kind as that described with reference to FIG. 3 and serves to protect the photoelectric cell 4** from external radiation and to prevent the ingress of dirt and dust into the light inlet aperture.

In the non-actuated state, in which the taut diaphragm 8 is not subject to any influence, the diffused light radiated by the light sources 2 passes through the aperture **13*a* on to the photoelectric cell 4 to excite the same in the above-described manner. When the diaphragm 8 is depressed by actuation with a finger 7, it comes to bear against the funnel-shaped wall of the recess 13*a* so as to interrupt the photoelectric function of the cell 4** for the period of actuation.

Figure 8:
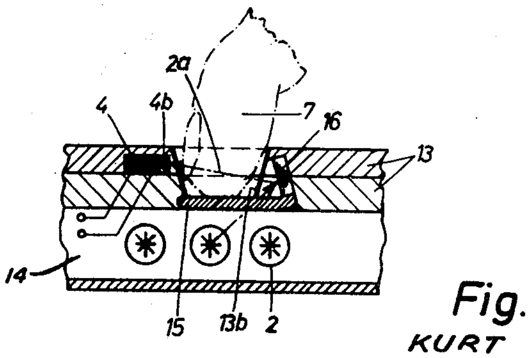
FIG. 8 shows a cross-section of a modification of the subject matter of the invention, in which a light filter is located between the light source and the photosensitive cell.

FIG. 8 shows an embodiment of similar construction to that shown in FIG. 7, the light sources 2 likewise being located in a free chamber 14 beneath the intermediate layers 13. In this case, however, the troughs 6 are formed by tapered recesses **13*b* in the intermediate layers 13. The recesses are closed at their lower ends near the free chamber 14 by a light filter 15. The purpose of this filter 15 is to filter out a certain part of the spectrum of the radiation derived from the light sources 2, for example the infra-red portion. The photoelectric cells 4 are also provided with a corresponding filter attachment 4*b* so that they are greatly protected from interference radiation derived from the ambient light, since only the filtered-out infra-red portion thereof can pass to the photoelectric cell 4 and this portion is substantially smaller than that delivered by the light sources 2 so that the photoelectric cells 4 have a correspondingly low response sensitivity. To achieve greater efficiency, a mirror 16 is mounted in that wall of the recess 13*b* which is opposite the photoelectric cell 4, which mirror concentrates the light rays 2*a* on the photoelectric cell 4, the path of said rays being such that the major part thereof are interrupted when the touch switch is actuated by inserting a finger 7 into the trough formed by the recess 13*b***.

What we claim is:

1. A radiation-responsive contactless touch switch for producing an electric pulse whenever radiation impinging on a photosensitive cell is interrupted for example by a portion of the hand, comprising a housing having a main chamber which opens onto a surface of said housing and a subchamber which opens into said main chamber substantially beneath the opening to said main chamber, a radiation source positioned within said subchamber, a radiation detector sensitive to the radiation from said source positioned within said main chamber and laterally disposed from said openings, and a depressible diaphragm covering the opening to said main chamber, the arrangement being such as to permit the diffused unguided radiation, while preventing substantially all direct radiation, from said source to reach said detector in the uninterrupted mode.

2. A radiation-responsive contactless touch switch for producing an electric pulse whenever radiation impinging on a photosensitive cell is interrupted for example by a portion of the hand, comprising:

(a) a radiation source;

(b) a radiation detector sensitive to the radiation from said source; and (c) a housing having a chamber which is accessible via an opening contained in a surface thereof, said chamber being comprised of two levels, with said source positioned on the one level and said detector positioned on the other, the arrangement of said levels being such as to permit the diffused unguided radiation while preventing substantially all direct radiation from said source to reach said detector in the uninterrupted mode.

3. A contactless touch switch according to claim 2 wherein the opening to said chamber is covered by a depressible resilient member, said member in its depressed state shielding said detector from the radiation from said source.

4. A contactless touch switch according to claim 3 wherein said depressible resilient member is a diaphragm.

5. A contactless touch switch according to claim 3 wherein said depressible member is a button constructed of resilient material.

6. A contactless touch switch according to claim 2 wherein said source is positioned substantially beneath the opening to said chamber and said detector is disposed laterally of the opening to said chamber.

7. A contactless touch switch according to claim 6 wherein the opening to said chamber is covered with a diaphragm.

8. A contactless touch switch according to claim 6 wherein the opening to said chamber is covered with a depressible button constructed of resilient material.

9. A contactless touch switch according to claim 2 wherein said detector is positioned substantially beneath the opening to said chamber and said source is disposed laterally of said opening.

10. A contactless touch switch according to claim 9 wherein the opening to said chamber is covered by a diaphragm.

11. A contactless touch switch according to claim 9 wherein said radiation source is annular and said detector is disposed beneath said annular source and concentric with the opening therein.

12. A contactless touch switch according to claim 9 wherein the opening to said chamber is covered by a depressible button constructed of resilient material.

13. A contactless touch switch according to claim 2 wherein said source and said detector are separated by a partition in said chamber having an aperture positioned substantially beneath the opening to said chamber.

14. A contactless touch switch according to claim 13 wherein said detector is positioned substantially beneath the aperture in said partition and said source is positioned laterally from said aperture, and wherein the opening to said chamber is covered by a resilient depressible button.

15. A contactless touch switch according to claim 13 wherein said source is positioned substantially beneath the aperture in said partition and said detector is positioned laterally from said aperture, and wherein the opening to said chamber is covered by a diaphragm, which diaphragm substantially covers said aperture when in the depressed mode.

References Cited

UNITED STATES PATENTS

| | | | |
|---|---|---|---|
| 2,174,206 | 9/1939 | Etter | 250—221 X |
| 2,187,012 | 1/1940 | Brenner | 250—221 X |
| 2,228,780 | 1/1941 | Roberts | 250—221 |
| 2,432,527 | 12/1947 | Lang | 250—221 X |
| 2,783,957 | 3/1957 | O'Neil et al. | 250—221 X |
| 3,056,030 | 9/1962 | Kelchner | 250—209 |
| 3,113,774 | 12/1963 | Blewitt | 250—226 X |
| 3,328,592 | 6/1967 | Shaw | 250—221 |
| 3,398,288 | 8/1968 | Sanders et al. | 250—227 X |
| 3,398,290 | 8/1968 | Basehore et al. | 250—221 X |

OTHER REFERENCES

Sharp, J. J. and Owen, C. E., IBM Technical Disclosure Bulletin, "Optical Keyboard," vol. 5, No. 10, March 1963, page 127.

ARCHIE R. BORCHELT, Primary Examiner

T. N. GRIGSBY, Assistant Examiner

U.S. Cl. X.R.

250—222